United States Patent [19]

Toyomura

[11] Patent Number: 4,631,418
[45] Date of Patent: Dec. 23, 1986

[54] POWER SUPPLY CONTROL DEVICE

[75] Inventor: Shigeru Toyomura, Kawasaki, Japan

[73] Assignee: Canon Kabushiki Kaisha, Tokyo, Japan

[21] Appl. No.: 796,540

[22] Filed: Nov. 12, 1985

Related U.S. Application Data

[63] Continuation of Ser. No. 503,856, Jun. 13, 1983, abandoned.

[30] Foreign Application Priority Data

Jul. 15, 1982 [JP] Japan .................................. 57-123146

[51] Int. Cl.⁴ ...................... H03K 19/003; G06F 1/00
[52] U.S. Cl. ............................. 307/200 A; 307/247 R; 307/296 R; 307/140; 364/900

[58] Field of Search ................... 364/707, 200, 900; 307/140, 125, 126, 130, 131, 200 A, 247 R, 296 R; 340/636, 654

[56] References Cited

U.S. PATENT DOCUMENTS

| | | | |
|---|---|---|---|
| 4,285,043 | 8/1981 | Hashimoto et al. | 364/707 |
| 4,361,873 | 11/1982 | Harper et al. | 364/707 |
| 4,409,465 | 10/1983 | Tubbs | 364/707 |
| 4,419,917 | 12/1983 | Sato | 364/707 X |

Primary Examiner—James D. Thomas
Assistant Examiner—David L. Clark
Attorney, Agent, or Firm—Fitzpatrick, Cella, Harper & Scinto

[57] ABSTRACT

A power supply control device is usable in a battery-driven electronic device, in which a power down mode is adopted when the battery is mounted.

7 Claims, 3 Drawing Figures

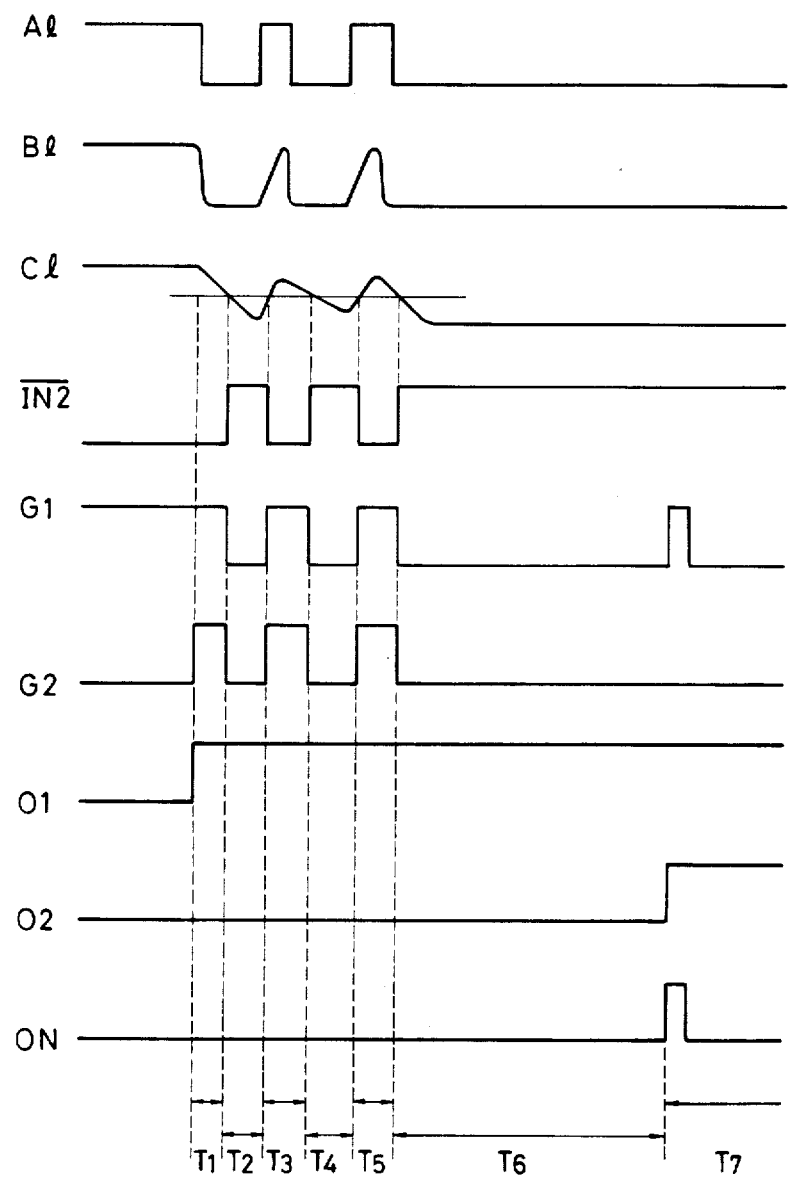

POWER SUPPLY CONTROL DEVICE

This application is a continuation of application Ser. No. 503,856 filed June 13, 1983, now abandoned.

BACKGROUND OF THE INVENTION

1. Field of the Invention

The present invention relates to a control device operable at the start of power supply to a large scale integrated circuit (LSI), for example of the C-MOS type.

2. Description of the Prior Art

The conventional C-MOS LSI employed in electronic devices such as electronic calculators has a so-called automatic power-down mode in which the power supply is continued to the memory part alone but is automatically discontinued to all other circuits for saving power in case key operations are not conducted for a determined period.

Such a device can be activated by supplying power to such other circuits with a power-on key. Also at the start of power supply by mounting the battery, the operation of the device is automatically initiated by clearing the internal memory of LSI.

Such an LSI has resulted in the following drawbacks in, for example, an electronic device with a printer.

In a usual electronic calculator with a printer, a print such as "CLEAR" is recorded on the recording sheet at the start of power supply in order to indicate such start. Also at battery replacement such an electronic calculator has to be turned upside down because the battery case is positioned at the bottom.

If the electronic calculator is immediately activated at the battery loading, there is initiated the operation of printing "CLEAR" etc., and there may result sheet feeding troubles because the calculator is placed upside down in this state and printing troubles because of undesired key actuations.

Also incomplete contact with the contact leads at battery replacement may cause chattering, thus disabling the normal operation of printing "CLEAR" because the power supply is interrupted and reestablished again before the printing operation is completed.

SUMMARY OF THE INVENTION

In view of the foregoing, the object of the present invention is to avoid the above-explained drawbacks by adopting a power-down mode in which the power supply is partially cut off at battery replacement.

BRIEF DESCRIPTION OF THE DRAWINGS

FIG. 3 is a waveform chart showing the function of the circuit shown in FIG. 2.

DESCRIPTION OF THE PREFERRED EMBODIMENTS

Figure 1:
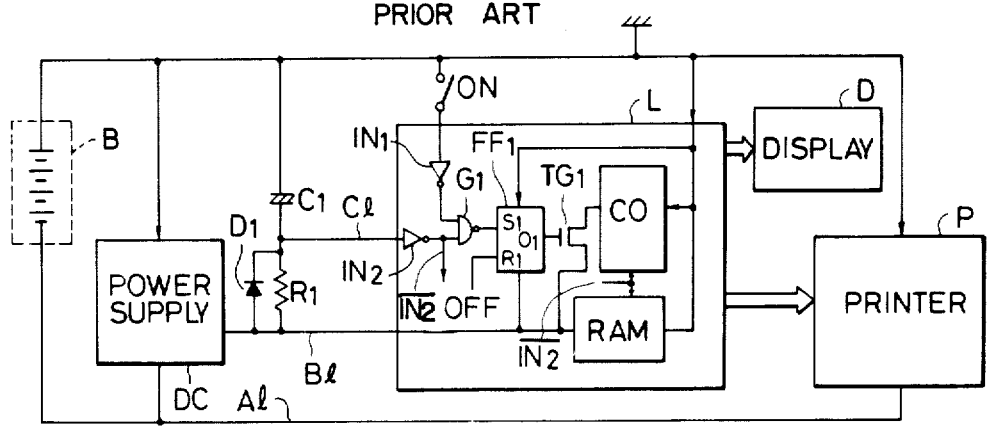
FIG. 1 is a circuit diagram showing a conventional control device.
Figure 2:
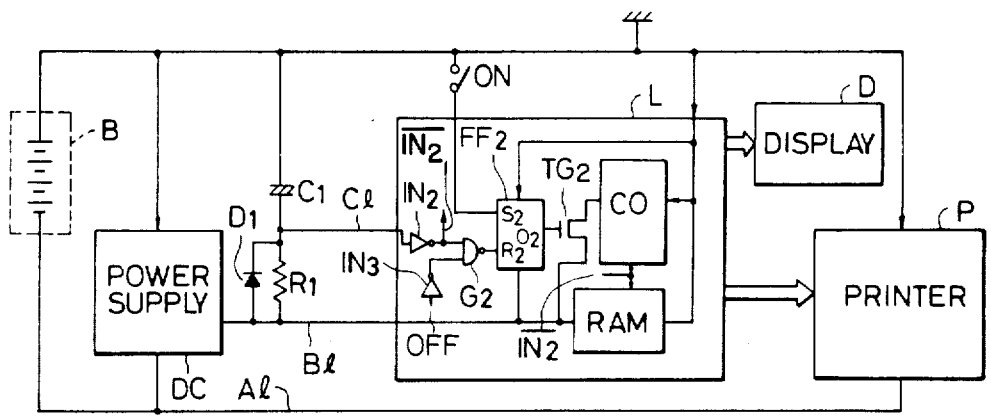
FIG. 2 is a circuit diagram showing the control device of the present invention.

Referring to FIGS. 1 and 2, there are shown a battery B incorporated in the electronic calculator; a power supply circuit DC for obtaining a stabilized voltage from the battery B; a capacitor C1, a resistor R1 and a diode D1 for generating a reset signal at the start of power supply; and a power switch ON for activating the entire electronic calculator. A one-chip large scale integrated circuit L with an automatic power-down function is composed of inverters IN1, IN2, in FIG. 1, and IN2, IN3 in FIG. 2; R-S flip-flops FF1, FF2 in FIGS. 1 and 2, respectively; a random access memory RAM continuously powered to store data; a control circuit CO; and transfer gates TG1, TG2 in FIGS. 1 and 2, respectively controlling the power supply to the control circuit CO and being opened by output signals "1" from the respective flip-flops FF1, FF2 for power supply to the control circuit CO thereby activating the entire electronic calculator.

There are also shown a display unit D and a printing device P.

Now reference is made to FIG. 3 showing the function of the above-described circuits.

At the battery mounting, the voltage on a line A1 assumes the illustrated form because of a chattering phenomenon. Because of the presence of a capacitor in the power supply circuit DC, an integrating circuit composed of C1, R1 and D1 generates a reset signal on a line C1 as illustrated, and this reset signal is supplied to the inverter IN2. Since the threshold level of inverter IN2 is about a half of the input voltage, the inverter IN2 generates output signals as illustrated. These output signals are supplied to a NAND gate G1 in FIG. 1 or to a NAND gate G2 in FIG. 2 to obtain inverted output signals as shown by G1, G2 in FIG. 3. The output signals of the NAND gate G1 are supplied to the set input port S1 of the flip-flop FF1 in FIG. 1, while the output signals of the NAND gate G2 in FIG. 2 are supplied to the reset input port R2 of the flip-flop FF2, so that the output O1 of the flip-flop FF1 is set to the level "1" while the output O2 of the flip-flop FF2 is set to the level "0". Therefore the transfer gate TG1 in FIG. 1 is rendered conductive to supply power to the control circuit CO, while the transfer gate TG2 in FIG. 2 remains non-conductive so that the control circuit CO is unpowered and remains inactive. Also a signal IN2, the output of the inverter IN2, is supplied to the control circuit CO and to the random access memory RAM with such a duration as to reset the control circuit CO and the random access memory RAM, when it is shifted to the level "0".

Consequently, in the conventional apparatus shown in FIG. 1, the power supply is already started in a period T1 shown in FIG. 3 but the device is deactivated because of the resetting by the signal IN2. In a succeeding period T2, the signal IN2 is shifted to "0" to terminate the resetting, whereby the device is activated to initiate the printing "CLEAR". However the resetting is again conducted in a succeeding period T3 to forbid the preceding operations, and the operation is started again from the beginning in a succeeding period T4. The resetting is again conducted in a period T5, and the normal operation is started in a period T6 since the chattering phenomenon comes to the end.

The erroneous operation mentioned above does not take place in the circuit shown in FIG. 2 despite of chattering phenomenon in the power supply, since the transfer gate TG2 remains non-conductive.

The device can be activated by actuating the power switch ON, whereby the flip-flop FF2 is set to render the transfer gate TG2 conductive.

As explained in the foregoing, the present invention provides a reliable electronic device without erroneous operations by partially cutting off the power supply at battery loading. It will also be apparent that the present invention can be effectively applied to electronic devices provided just with display units.

What I claim is:

1. A power supply control device for use in battery-powered electronic apparatus, comprising:

transfer gate means connected between a battery and the battery-powered electronic apparatus for selectively supplying power to the battery-powered electronic apparatus;

a flip-flop circuit for selectively opening and closing said transfer gate means;

means for generating a first signal upon electrical loading the battery; and means for generating a second signal to instruct the start of operation of the battery-powered electronic apparatus;

wherein said flip-flop circuit receives the first signal at one input thereof and the second signal at the other input thereof so that said transfer gate means is opened by the first signal and is subsequently closed by the second signal to supply power to the battery-powered electronic apparatus.

2. A power supply control device according to claim 1, wherein the battery-powered electronic apparatus generates a third signal when no instruction is directed to the control device for a predetermined time interval and said flip-flop circuit receives the third signal at said one input.

3. A power supply control device according to claim 1, wherein the battery-powered electronic apparatus controls a printing device.

4. A power source controller for battery driven electronic apparatus, comprising:

detection means for detecting the electrical loading of a battery to serve as a power source for the apparatus;

status storing means connected to said detection means and responsive to the detection of battery loading for storing a power-off status wherein power is not supplied from the battery to the apparatus;

power switch means connected to said status storing means for enabling an operator to selectively store one of a power-on and a power-off status in said status storing means; and means responsive to the power-on and power off status of said status storing means for respectively supplying or cutting off power from the battery to the apparatus.

5. A power source according to claim 4, wherein said status storing means includes a flip-flop circuit.

6. A power source controller according to claim 4, further comprising gate means for controlling power-off and power-on states of said status storing means.

7. A power source controller according to claim 4, wherein the apparatus includes display means and printing means.

* * * * *